United States Patent [19]

Sawada

[11] 4,188,316
[45] Feb. 12, 1980

[54] PROCESS FOR PRODUCING SHAPED ARTICLES WITH PATTERNS

[75] Inventor: Shuichi Sawada, Hamamatsu, Japan

[73] Assignee: Nippon Gakki Seizo Kabushiki Kaisha, Japan

[21] Appl. No.: 801,414

[22] Filed: May 27, 1977

[30] Foreign Application Priority Data

Jun. 3, 1976 [JP] Japan .................................. 51-64848

[51] Int. Cl.$^2$ ............................................... C08J 3/20
[52] U.S. Cl. .................................. 260/40 R; 264/245; 264/246
[58] Field of Search ........................ 264/245; 260/40 R

[56] References Cited

U.S. PATENT DOCUMENTS

| 3,562,379 | 2/1971 | Duggins | 264/245 X |
| 3,773,886 | 11/1973 | Starr et al. | 264/245 |
| 3,957,943 | 5/1976 | Ogura | 264/245 |
| 3,981,951 | 9/1976 | Richmon | 264/245 X |

FOREIGN PATENT DOCUMENTS 1076167 7/1967 United Kingdom.

Primary Examiner—Sandra M. Person
Attorney, Agent, or Firm—Robert E. Burns; Emmanuel J. Lobato; Bruce L. Adams

[57] ABSTRACT

Process for producing a molding compound with a pattern which comprises the steps of:
(a) preparing a plurality of unsaturated polyester resin compositions of different color tones;
(b) uniting the plural resin compositions after at least either one in each pair of the adjacent compositions to be united has been thickened; and
(c) thickening all of the united resin compositions to form a solid or semi-solid molding composition.

13 Claims, 8 Drawing Figures

COMPOUND A

COMPOUND B

COMPOUND A

C
B
A

PROCESS FOR PRODUCING SHAPED ARTICLES WITH PATTERNS

BACKGROUND OF THE INVENTION

The present invention relates to a process for producing shaped articles with patterns by using a molding compound (hereinafter referred to as MC). The present invention contemplates producing shaped articles with patterns by causing a plurality of unsaturated polyester resin compounds or compositions of different color tones to thicken, uniting the thickened compositions to produce a bulk molding compound (hereinafter referred to as BMC) or a sheet molding compound (hereinafter referred to as SMC), and producing a shaped article with patterns which consists of cured unsaturated polyester resins and has excellent clearness of patterns according to a desired design through the use of the resultant molding compounds. The term "molding" as used herein does not necessarily mean a molding process using a mold, but includes a molding process wherein an MC is merely placed on a molding plate, the roller molding process, and the calender molding process.

Attempts have been made heretofore to produce shaped articles with patterns, particularly shaped objects having marble-like patterns, without skillful fabrication and processing such as cutting, carving and polishing of marble. Among these, there have been proposed: (1) a casting method wherein coloring agents or colored fillers are incompletely dispersed in a matrix resin material comprising thermosetting resins such as unsaturated polyester resins, and the resultant dispersion is cast in a mold, debubbled, and cured; (2) and injection method wherein coloring agents are admixed into a debubbled base resin compound in an intermediate part of a supply line under pressure and the resulting blend is cured in a mold; and (3) an SMC method wherein a preformed sheet made of glass fibers is impregnated with a base or matrix resin, and coloring agents are added to the impregnated fiber sheet prior to roller pressing, thereby producing an SMC, the SMC being inserted between a male mold and a female mold to be formed under pressure into a shaped article.

All of these methods contemplate forming patterns by dispersing coloring agents in a base resin while forming light and shaded parts throughout the base resin. However, these methods are accompanied by the following problems.

(1) Because the pattern is mainly formed randomly by contingency or chance, there is little room for designing of a high quality pattern. The quality of the resultant pattern is non-uniform in most cases, and shaped articles having poor appearance have remarkably low commodity value.

(2) Because the diffusion of the coloring agent due to interfusion between the pattern portions and the base portions, cannot be avoided, a clear and distinct pattern is difficult to produce, and the design performance is limited. This tendency is particularly conspicuous in the case of the injection method wherein a turbulent flow of colored resins tends to occur during injection.

(3) Because the incompletely mixed coloring agent diffuses into the base resin with the lapse of time and, as a result, the pattern becomes obscure in the case of the casting method and the injection method, the mixed molding materials cannot be entirely stored in an uncured state before the shaping thereof. Accordingly, it is necessary to provide a process for mixing a coloring agent adjacent to a shaping process in each shaping station. Furthermore, because mixing of coloring agents entails the introduction of air into the base resin which adversely affects the quality of the final shaped product, it is necessary in some cases to provide a deaerating process adjacent to the process for mixing a coloring agent.

SUMMARY OF THE INVENTION

It is an object of the present invention to provide a process for producing shaped articles with patterns which is not accompanied by the above described problems encountered in the prior art. More specifically, the present invention aims at: providing a process for producing shaped articles with patterns by which a shaped article having even a complicated configuration can be easily produced without the use of such processing as cutting or polishing which is required for the production of an article from natural marble; producing shaped articles with patterns in which the patterns are clear and not faded out by a production process having a high freedom of design performance wherein the generation of a pattern can be designed without merely relying on accident; providing a process for producing a raw material for shaped articles with patterns (that is, BMC or SMC) which has good storage life, thereby permitting the separation of a process for preparing molding materials from a shaping process for forming final shaped articles with patterns; and obtaining shaped articles imparting a high-class visual sensation similar to natural marble with respect to color tone, weight and quality.

Therefore, in accordance with the present invention, briefly summarized, there is provided a process for producing a patterned MC which comprises the steps of:

(a) preparing a plurality of unsaturated polyester resin compositions of different color tones;
(b) uniting the plural resin compositions after at least either one in each pair of the adjacent compositions to be united has been thickened; and
(c) thickening all of the united resin compositions to form a solid or semi-solid molding compound.

In accordance with the present invention, there is also provided a process for producing shaped articles with patterns which comprises forming and curing under pressure the MC obtained as described above as required.

DETAILED DESCRIPTION

Figure 1:
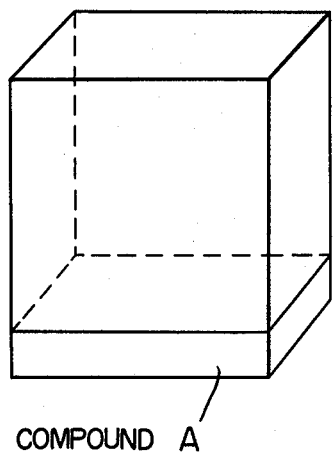
FIGS. 1 through 3 are perspective views for a description of a process for producing a BMC with a stratiform pattern in accorcance with this invention.

The term "unsaturated polyester resin compound" or composition as used herein means a molding material which comprises, in addition to an unsaturated polyester resin, additives such as a coloring agent, filler, thickening agent, diluent, hardener, lubricant and the like, as required, and is ready for molding as it is.

The term "unsaturated polyester resin" as used herein means a mixture obtained by dissolving an unsaturated polyester in reactive monomers having an ethylenically unsaturated bond and adding a polymerization inhibitor to the solution, as required. The unsaturated polyester includes an unsaturated alkyd resin, i.e., a product obtained by esterifying unsaturated dibasic acids or anhydrides thereof or a mixture of the acids or anhydrides and saturated dibasic acid with glycols; prepolymers having no substantially cross linkage (a so-called β-polymer) of saturated or unsaturated dibasic acids esterified with unsaturated alcohols; and mixtures thereof.

In the above description, the unsaturated dibasic acids or anhydrides thereof are those which contain an ethylenic double bond. Examples of such acids or anhydrides are maleic acid or anhydride thereof, fumaric acid, mesaconic acid, and itaconic acid or anhydride thereof. Examples of the saturated dibasic acids are phthalic acid and substituted phthalic acid and anhydrides thereof and adipic acid. Examples of the glycols which react with those dibasic acids to form esters are ethylene glycol, diethylene glycol, triethylene glycol, propylene glycol, dipropylene glycol, butanediol, and neopentyl glycol. As the unsaturated alcohol, allyl alcohol may be used.

The reaction conditions under which the above mentioned polyester is formed from these acids and alcohols very depending upon the respective reactants, but in all cases the polyester can be prepared by known methods without difficulty. Preferably, the polyester has an acid number of 20 to 60 and a molecular weight of the order of 1000 to 3000. Examples of the reactive monomers having an ethylenically unsaturated bond in which the unsaturated polyesters are dissolved are styrene, divinylbenzene, vinyltoluene, vinyl acetate, methyl methacrylate, α-methylstyrene, and diallyl phthalate. The unsaturated polyester and the reactive monomer are used in a weight ratio of polyester to monomer of 3:1 to 1:3. Up to 1 part by weight of known polymerization inhibitors such as quinones, hydroquinones, phenols, quaternary ammonium salts and hydrazine salts is added, as required, to 100 parts by weight of the unsaturated polyester resin thus obtained in order to adjust the pot life during which the unsaturated polyester resin is workable. Unless otherwise indicated, a weight ratio is hereinafter used on the basis of 100 parts by weight of the unsaturated polyester resin.

An unsaturated polyester resin compound can be prepared by adding 0 to 1000 parts, preferably 100 to 400 parts, of a filler, 0 to 15 parts, preferably 0 to 5 parts, of a thickening agent, 0 to 5 parts of a hardner in consideration of the pot life, 0 to 40 parts of a low shrinkage additive, a coloring agent, and other additives, as required, into the unsaturated polyester resin.

The filler is selected from such materials as aluminum hydroxide, calcium carbonate, alumina, stone powder, crushed and pulverized FRP wastes, clear, light-colored resin powders, siliceous sands and glass fibers by taking the aesthetic appearance and strength of the resulting compound into consideration. As the low shrinkage additive, various thermoplastic polymers such as polystyrene and polymethyl methacrylate can be used. As the thickening agent, the oxides and hydroxides of a metal, preferably an alkaline earth metal, such as magnesium oxide, magnesium hydroxide, calcium oxide and lithium oxide can be used.

A suitable hardner is one which is capable of providing an appropriate hardening action at the molding temperature of the SMC as described hereinafter. For high temperature molding (not less than 120° C.), t-butyl perbenzoate, cumene hydroperoxide and the like are used; for middle temperature molding (not less than 70° C.), lauroyl peroxide, benzoyl peroxide and the like are used; for middle low temperature molding (not less than 40° C.), bis-(4-t-butyl cyclohexyl) peroxycarbonate, t-butyl octoate plus cobalt (Co) or calcium (Ca) promotors and the like are used; and for room temperature curing, a combination of methyl ethyl ketone peroxide and an organometal compound promotor is used. The above stated temperature ranges indicate a standard of the curing temperature used, and the respective hardners can be used at a curing temperature deviating the specified temperature ranges to some extent.

As the coloring agent, known dyes or pigments can be used, and the type and amount of the coloring agent used depend upon the required color tone. Preferably, the coloring agent is acid or neutral (oil-soluble, dispersible) dyes and pigments. If necessary, the compound may contain 0 to 5 parts of an internal releasing agent such as zinc stearate and 0 to 5 parts of a surface finish improving agent such as finely divided polyethylene.

The unsaturated polyester resin compound is prepared by mixing the respective ingredients in a conventional stirred tank mixer or kneader. The order of addition of the respective ingredients is optional. It is preferable, however, that the thickening agent be added last because the viscosity of the compound begins in increase immediately after the thickening agent is added. In mixing, if the compound is stirred in a reduced pressure tank equipped with a vacuum pump to remove bubbles therefrom, a compound free of bubbles may be easily obtained, and, thus, this mixing procedure is preferable.

A plurality of compounds of different color tones is prepared by varying the type or concentration of the coloring agent and, if necessary, the type or concentration of the filler in the above described procedure. The term "different color tones" as used herein also includes different color tones and/or quality sensation due to the difference of the type and concentration of the filler. In addition, some of the plural compounds may be the same in color tone.

Then, the plural unsaturated polyester resin compounds thus obtained are united together after at least one of the adjacent resin compounds forming a pair to be united has thickened. In accordance with the present invention, the thickening or viscosity build-up of the above mentioned compound may be conducted by using at least one of the following two methods.

The first thickening method is one which uses the above mentioned thickening agents. That is, the above named polyesters all contain a>C=O or —COOH group. When the oxides or hydroxides of a metal, particularly an alkaline earth metal, as the thickening agent are allowed to act on the polyester, a salt formation reaction and/or a complex salt formation reaction occurs, building up the viscosity of a compound containing these ingredients to a remarkable extent, whereby the compound is converted into a solid or semi-solid having little tackiness. In this case, if about 0 to 1 part of water or a compound capable of increasing the proportion of the —COOH group such as phthalic anhydride is added to the compound, the effect of the thickening agent is enhanced. It is possible to obtain a compound having no tackiness by maintaining a compound with the thickening agent added thereto at a suitable temperature, e.g. room temperature to 50° C., for a period of e.g. 15 minutes to 24 hours.

The second thickening method is one which uses a crystalline unsaturated polyester as the above-mentioned polyester. For example, a solution of a crystalline unsaturated polyester (hereinafter merely referred to as a crystalline polyester) in reactive monomers, which polyester is a condensation product of symmetric aliphatic glycols and fumaric acid or lower alkyl esters of fumaric acid or a product of symmetric saturated dibasic acids such as terephthalic acid, aliphatic glycols and ethylenically unsaturated dibasic acids, is in a fluid state when it is heated, but it becomes a pasty resin at room temperature or a temperature below room temperature because it undergoes a thickening phenomenon due to the partial precipitation and growth of an alkyd crystal at these temperatures. Particularly, when the filler is added to the compound, it is possible to obtain a solid or semi-solid having no tackiness even at normal temperature.

The above-mentioned unsaturated or saturated dibasic acids such as maleic acid can be used in a quantity such that they do not hinder the crystallization of the unsaturated polyester in conjunction with fumaric acid. Examples of the symmetric aliphatic glycols are 1,4-butanediol, 1,6-hexanediol, 1,4-cyclohexanediol, neopentyl glycol, bis-(hydroxyethyl) resorcinol and ethylene glycol. A part of the symmetric glycol may be replaced by non-symmetric glycols such as propylene glycol and dipropylene glycol. Such partial substitution of the non-symmetric dibasic acids or glycols for the fumaric acid or symmetric aliphatic glycols has the effect of reducing the temperature at which the crystalline polyester is dissolved in the reactive monomer. Furthermore, in the unsaturated polyester obtained by using terephthalic acid as the saturated dibasic acid, there is a tendency for the alkyd molecule to form straight chains and, thus, tends to assume a crystalline state.

Accordingly, a reactive monomer solution of a condensation product of terephthalic acid and various diols and the unsaturated dibasic acids can be formed into an excellent crystalline polyester resin. In this case, as the diol ingredient, ethylene glycol, propylene glycol, neopentyl glycol and the like may be used. When a high proportion of ethylene glycol in the diol ingredient is used, a polyester resin with a high crystallinity is obtained. Also, as the ethylenically unsaturated dibasic acid, maleic anhydride, fumaric acid, itaconic acid and the like are used. It is also possible to add the above mentioned non-crystalline unsaturated polyester and/or the thickening agent to the crystalline polyester resin so obtained.

The compound thickened by either of the above mentioned two methods after once being thickened can be heated to a temperature below the curing temperature thereof to soften or fluidize it. In any case, a particular compound must be softened at a temperature below the curing temperature thereof. The softening temperature can be adjusted within the range of about 30 to 120° C. by varying the type and amount of the thickening agent, or by substituting the fumaric acid ester and/or the symmetric glycols with other dibasic acids and non-symmetric glycols, respectively, in the case of the use of the fumaric acid type crystalline polyester, or by substituting the terephthalic acid component and the ethylene glycol component with other phthalic acid components and diol components, respectively, in the case of the use of the terephthalic acid type polyester, or by substituting a part of the crystalline polyester with the above-mentioned amorphous polyesters, or by using a combination with the thickening agents, or by using a combination of the above mentioned methods.

Then, after at least either one of the adjacent unsaturated polyester resin compounds forming a pair to be united has thickened to a required extent, the plural unsaturated polyester resin compounds are united and the viscosity of the entire compounds is built up to produce a solid or semi-solid BMC or SMC. It is desirable that the degree of thickening or viscosity build up at this stage be such that the Shore hardness of the compound exceeds A20 for the sake of preservation and ease of after-processing. The degree of thickening is adjusted to conform to the degree of disorder in the required pattern boundary. In order to form a pattern of clear boundary, it is preferable that the Shore hardness of at least one compound be a value of no less than A20. The BMC may be further cut into a sheet of an appropriate thickness to produce an SMC. The SMC is ready for curing and shaping. A suitable Shore hardness of the BMC for cutting is of the order of A20 to A30. A series of these operations will be illustrated with reference to the accompanying drawings.

First, the preparation of a BMC with a stratiform pattern will be illustrated. Referring to FIG. 1, an unthickened compound which has been sufficiently kneaded is poured into a vessel of any appropriate shape. Then, the compound is thickened by the use of a thickening agent to form a first layer (which is called a compound A). When the crystalline polyester is used, a compound softened with heat is poured into the vessel. The compound is then cooled to be thickened, thereby forming a first layer. In either of these procedures, the thickening of the compound proceeds with the elapse of time. However, it is possible to promote the thickening by heating a compound to a suitable temperature below the curing temperature of the resin in the case of the use of the thickening agent, or by applying suitable cooling to a compound in the case of the use of the crystalline polyester.

Figure 2:
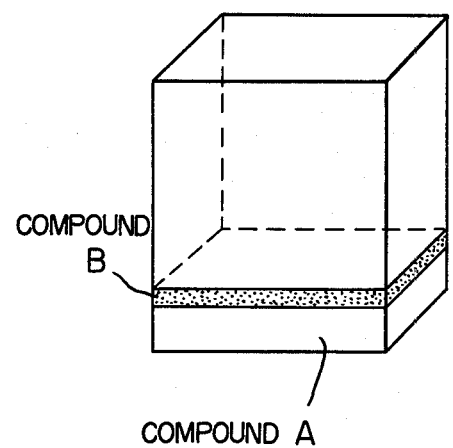

A compound of different color tones is then poured on the thickened compound A and the poured compound is thickened to form a compound B layer (as is shown in FIG. 2). In this case, the layers A and B are not dissolved or mixed with each other and the layer B undergoes thickening under a condition such that the layers A and B are completely separated into two phases because the layer A has already lost fluidity and become semi-solid. Thereafter, the same procedures are repeated until the required number and thickness of the layers attained. In this manner, a BMC with a stratiform pattern is obtained as shown in FIG. 3.

Figure 3:
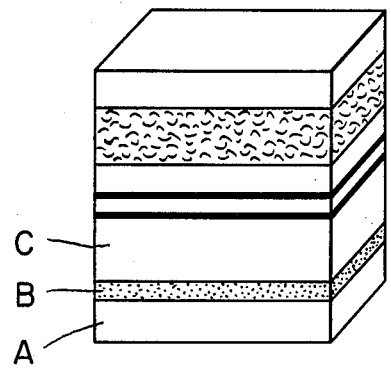

Although FIGS. 1, 2, and 3 illustrate only the formation of a parallel stratiform pattern, it is possible to form any stratiform pattern by suitable methods, for example, by inserting a male mold of an appropriate shape into a unthickened compound layer contained in a vessel and thickening the entire compound layer. In addition, if the next layer is poured on the first layer before it undergoes a sufficient degree of thickening, a BMC with a disorderly stratiform pattern may be prepared. Also, if a differential degree of thickening is given between the two layers contacting each other, it is possible to obtain the varying color tones near the boundary.

Figure 4:
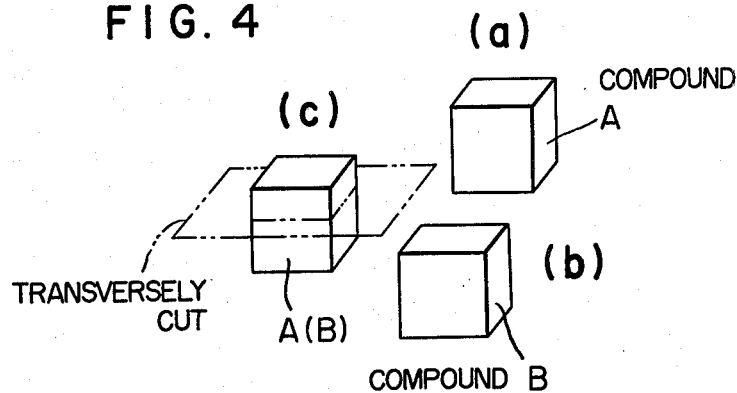
FIGS. 4 and 5 are perspective views for description of another example of the process for producing a BMC with a stratiform pattern.
Figure 5:
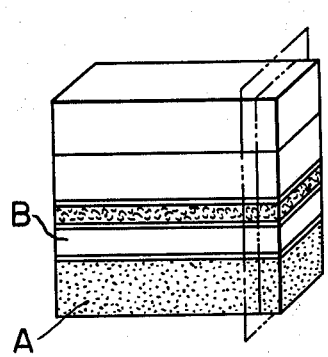

According to a second method for producing a similar BMC with a stratiform pattern, a predetermined number of compounds of different color tones are preliminarily poured into a vessel to form compounds A, B, C, D, respectively, and the respective compounds are thickened, as is shown in FIGS. 4(a) and 4(b). The respective compounds are then cut into a sheet of any appropriate thickness in the transverse direction (FIG. 4(c)). Subsequently, unthickened compounds separately prepared for interlayer adherence are interposed between the respective layers to form a laminate. The entire laminate is thickened to produce a BMC with a stratiform pattern as is shown in FIG. 5.

Figure 6:
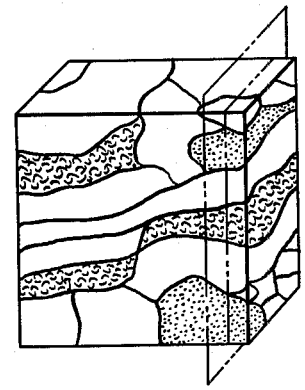
FIG. 6 is a perspective view of one example of a BMC with a massive pattern.

A method for producing a BMC with a massive pattern will be now illustrated. As in the second method for producing a BMC with a stratiform pattern, a plurality of the compounds of different color tones which have been preliminarily prepared and thickened are cut into masses of any shape. These masses are combined with each other, and the combined mass is charged into a new vessel. The charged mass is pressed together while it is heated as required to produce a BMC with a massive pattern as is shown in FIG. 6.

In the process of the foregoing description, a plurality of compounds are explained as though they are subjected to a uniform degree of thickening in the production of the BMC. However, when a BMC composed of a plurality of compounds having an equal degree of thickening is subjected to heat molding, the respective compound portions of the BMC tend to become fluid simultaneously with the rise in temperature. As a consequence, in the case where a structure of a complicated shape and a deep drawn shape which cannot be molded without causing the fluidization of compounds is molded, fading of patterns due to mutual dissolution between the patterns and diffusion of coloring agents is inevitable. In such a case, it is therefore preferable to change the degree of thickening (in other words, fluidizing temperature) of the plural compounds to be united, i.e., to preliminarily set the fluidizing temperature of the base compound to a lower level in uniting the base compound with pattern portions of a BMC.

As stated above, this may be achieved by varying the fluidizing temperature by changing the amount of the thickening agent or by changing the molecular structure or blend ratio of amorphous unsaturated polyester of the crystalline polyester or additives to the crystalline polyester. It is preferable, however, for this purpose to vary the type of the thickening agent or to combine a thickening method using a thickening agent with a thickening method using a crystalline polyester. In particular, the latter method is different from the former method in that the thickened compound by the latter more sensitively changes its fluidizing property under heating than the former, and a combination of these two methods is effective in the formation of a complicated pattern, and is therefore preferable.

That is, by varying the degree of thickening between the adjacent compounds forming a pair to be united, a BMC consisting of a portion 1 exhibiting fluidity at a relatively low temperature and a portion 2 exhibiting less reduction in viscosity even at a significantly high temperature is produced. When the BMC is heated in a mold, only the portion 1 melts and fills the empty concave-convex portions in the mold. Therefore, the BMC can be cured without causing melting of the portion 2 or the mutual dissolution between the portions 1 and 2, thereby producing a good shaped article while maintaining the clearness of the pattern.

By way of example, a pattern compound containing MgO as a thickening agent and a base compound thickened by the use of a crystalline polyester are prepared, and the two compounds are formed into a BMC according to any of the procedures described above. During molding, the base compound first melts and becomes a fluid filling the empty portions in a mold, whereby a shaped article with clear boundaries of the pattern portions is produced. In this case, if a hardener which decomposes at a lower temperature than the decomposition temperature of the hardener of the compound constituting the pattern portion is used in the base compound, the base portion can be cured before the pattern compound is fluidized. Similar results may be expected by using a combination of MgO and $Li_2O$, $Ca(OH)_2$ and a crystalline polyester, and a crystalline polyester and a crystalline polyester plus an amorphous polyester plus $Mg(OH)_2$ for the thickening of each of the adjacent compounds to be united.

The BMC obtained in the above-described manner may be used as it is as a BMC curing and molding material. However, in order to obtain an SMC molding material, the BMC with a stratiform pattern or massive pattern obtained in the above-mentioned manner is cut into a material of a predetermined thickness in the longitudinal direction, for example, along the chain lines shown in FIGS. 5 and 6. If cutting is carried out after a sufficient degree of thickening has been achieved, irrespective of the method used in the thickness, it will be easy to cut the BMC, and there will be little tendency for a sheet to become out of shape after cutting. However, the primary difference between the BMC and the SMC is merely in the shape such as thickness. Accordingly, it is possible to produce an SMC with patterns not via BMC with patterns by reducing the thickness of the respective layers in the process for producing the above mentioned BMC, for example, in the process for producing the BMC with patterns as shown in FIGS. 1, 2, and 3, or by cutting the massive compound as shown in FIG. 4 in the transverse direction, thereafter cutting the cut compound in the longitudinal direction to form compounds in the form of a long strip of paper or compounds of any plane shape, and arranging the compounds in the lateral direction to unite them. However, in this case, there will exist great difference with regard to ease of pattern arrangement, particularly clearness of the pattern at the end surfaces and industrial productivity.

It is needless to say that in the production of the above mentioned BMC and SMC, the thickened compounds and the BMC and SMC thus produced must be handled or stored at a temperature below the fluidizing temperature thereof for example, by cooling to a temperature below 0° C. as required (for example, in the case of a room temperature molding material or middle low temperature molding material having a molding temperature of 10° C. to 40° C.) except for the case where a shaped article with a disordered pattern is desired.

The BMC and SMC obtained in the above-described manner is subjected to pressure molding at a temperature at which hardener functions. For pressure molding, any known pressure molding method wherein the BMC or SMC is caused to closely contact a mold under pressure, and wherein the mold is heated to cure the BMC or SMC by heat may be used, such as a heat curing molding using a high pressure press, a heat curing molding in a reduced pressure bag, and a heat curing molding in an increased pressure bag. In particular, according to heat curing molding using a high pressure press, it is possible to obtain a shaped article having smooth inside and outside surfaces and beautiful patterns.

On the other hand, the MC, particularly the SMC, of the present invention may also be cure-molded by a contact pressure molding process in which a remarkably low pressure is used or no pressure is required. Further, because contact pressure molding uses no pressure, it is accompanied by problems such as bad contact with the mold and compound flow in the case of the heat curing system as compared with a pressure and heat curing system. However, contact pressure molding has an advantage in that molding can be carried out by means of simple equipment similar to that used in the hand lay up method. Particularly, for the SMC using a room temperature hardener, a substantial simplification of equipment can be achieved because a heating apparatus may also be omitted. In the case of room temperature or middle low temperature curing, pressure may be applied through a cover film such as a vinylon (acetalized polyvinyl alcohol) film which serves to render the surfaces of a shaped article beautiful.

The above-mentioned and other advantages of the present invention can be summarized as follows.

(1) The shaped article produced by the process of the present invention has a clear pattern, has much less fading in the pattern than does a shaped article obtained by other known processes, and has excellent color tone.

(2) The design of a pattern may be laid out in specifications. For example, it is possible to produce a shaped article having a pattern varying gradually from light color tone to dark color tone from one end thereof toward the other end or a pattern in which spotty designs are accentuated. In this way, the design of a pattern may be produced at the first step of producing the BMC. Accordingly, the process of the present invention has excellent designability.

(3) The BMC and SMC can be stored in cold and dark places for a long period of time. They can be molded to form a shaped object as required by means of molding equipment such as a press. There is no need for providing mixing and degassing apparatus adjacent to the molding machine as is the case of prior pattern molding methods.

(4) A shaped article possessing quality feel, color tone and weight feel similar to those of marble can be produced merely by subjecting the BMC and SMC to a simple molding operation such as pressing. Accordingly, the process of the present invention is advantageous in mass production.

In order to indicate more fully the nature and utility of this invention, the following specific examples of practice are set forth, it being understood that these examples are presented as illustrative only and that they are not intended to limit the scope of the invention.

EXAMPLE 1

The second process for producing a BMC with a stratiform patterns as described above was followed by using three compounds having a basic formulation as indicated in the following Table 1 in which only the coloring agents were different from each other.

Table 1

| Compound formulation | |
| --- | --- |
| Unsaturated polyester resin ("U-PICA" BTS 100, manufactured by Toyobo Co., Ltd., Japan) | 100 parts (by weight) |
| Unsaturated polyester alkyd component (for a highly reactive BMC) | (60 parts) |
| Reactive monomer (styrene) | (40 parts) |
| Low shrinkage additive (a 30% styrene solution of polystyrene) | 20 parts |
| Filler (stone powder) | 200 parts |
| Hardener (benzoyl peroxide) | 1.5 parts |
| Thickening agent (MgO) (a particle size of about 150 mesh) | 1.0 part |

The components of a compound A according to the formulation of Table 1 were charged into a mixer in the order indicated in Table 1 to intimately knead the mixture. In the latter period of the kneading, the pressure in the mixer was reduced to remove the bubbles contained in the compound A. The resulting unthickened compound A was poured into a rectangular vessel of 70-cm length, 70-cm width and 70-cm depth and left standing overnight at a temperature of 25° C. to thicken the compound, thereby producing a light brown thickened compound mass A having substantially no stickiness.

Subsequently, a compound B (dark brown) having the same quality was poured into another vessel and a dark brown, thickened compound mass B was produced according to the same procedures as that set forth above.

Then, the light and dark brown, thickened compound masses A and B were randomly cut into pieces having thicknesses of 1 to 10 cm. The cut pieces were adequately randomly stacked in a new vessel of 70-cm length, 70-cm width, and 70-cm depth in such a manner that the concentration of the component B increaaed from the lower portion toward the upper portion. During this procedure, a fresh, unthickened compound C (brown) was thinly applied between these layers to fill the spaces therebetween and to bond them together, thereby producing a BMC with a pattern corresponding to the BMC shown in FIG. 5. The resulting BMC was left standing overnight to thicken the layer C to a sufficient degree.

Thereafter, the resulting compound mass was cut in the longitudinal direction into sheets each of a thickness of 2 cm to produce an SMC for molding. The curing temperature and softening temperature of this SMC were both in the range of 80° C. to 120° C. A sheet of this SMC 70 cm long, 70 cm wide, and 2 cm thick was heated at a temperature of 100° C. under a pressure of 10 kg/cm² for 10 minutes in a pressure-heat-curing molding machine comprising male and female molds of a mating shape. Thus, a beautiful shaped article having a pattern similar to a fault of rocks in which the layer C finely runs in the form of a hairline between the layers A and B and having no fading or blurring between these boundaries was obtained.

Even when the shaped article was subjected to after processing such as hole making and cutting, the processed section of the object had a continuous pattern similar to the surface. Accordingly, the shaped article had a natural appearance, quality feel, and good gloss which cannot be found in a conventional artificial marble. The entire color tone of the shaped article varied continuously from light brown at one end to dark brown at the other end, which corresponds to the expected design.

EXAMPLE 2

The process for producing a BMC with a massive pattern as stated above was followed with the use of three compounds having a basic formulation as indicated in the following Table 2 in which only the coloring agents were different from each other.

Table 2

| Compound formulation | |
|---|---|
| Unsaturated polyester resin | 100 parts (by weight) |
| Isophthalic acid type amorphous polyester resin | (70 parts) |
| Terephthalic acid type crystalline polyester resin | (30 parts) |
| Low shrinkage additive (a 30% styrene solution of polyestyrene) | 20 parts |
| Filler (siliceous sand) | 200 parts |
| Coloring agent (black iron oxide) | 0.05 part |
| Hardener (bis-(4-t-butylcyclohexyl) peroxycarbonate) | 1.5 parts |
| Thickening agent (Mg(OH)$_2$) | 0.3 part |

The components of a compound A according to the formulation of Table 2 were charged into a mixer in the order indicated in Table 2 to intimately knead the mixture. In this case, the crystalline polyester resin used was preliminarily stirred to a sufficient degree, and, as a result, mutual sliding between the molecules of the resin destroyed the orientation of the alkyd component, whereby the viscosity of the resin was reduced to a substantial degree. The use of this polyester resin facilitated the mixing of the above-mentioned compound. Similarly as in Example 1, in the latter period of the kneading, the pressure in the mixer was reduced to remove the bubbles contained in the compound A.

The resulting unthickened compound A was poured into a rectangular vessel measureing 1 m in length, 1 m in width and 1 m in depth and left standing overnight at a temperature of 15° C. The compound A was thereafter stored in a cooling chamber at a temperature of −5° C. for 5 days. During this process, the cross linking due to Mg(OH)$_2$ and crystallization of the compound were found to have amply progressed. Similarly, a compound B (with a coloring agent of 0.01 part by weight of black iron oxide) and a compound C (no coloring agent) were thickened. Thus, a total of three types of thickened compounds were prepared.

Each of the thickened compounds A, B and C was randomly cut into pieces of arbitrary volumes within the range of about 0.1 to 100 cm$^3$ and the resulting pieces were charged into a circular vessel 1 m in diameter and 1 m in depth. When the respective compound pieces were stacked little by little in the vessel and pressure was applied over the stacked pieces by a pressing mold while the pressure in the vessel was reduced, a BMC mass having no air void therein corresponding to the BMC mass shown in FIG. 6 was obtained.

An shaft was then pierced through the cylindrical BMC. An SMC 1 m in width and about 40 m in length was obtained by peeling a strip of a thickness of 2 cm from the outer skin of the BMC while rotating the cylindrical BMC around the shaft. Both the softening temperature and the curing temperature of the SMC were between 50 to 60° C.

Figure 7:
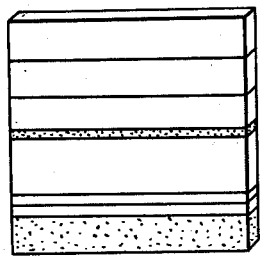
FIGS. 7(a) and 7(b) are perspective views of one example of an SMC with a stratiform pattern and an SMC with a massive pattern, respectively.
Figure 7:
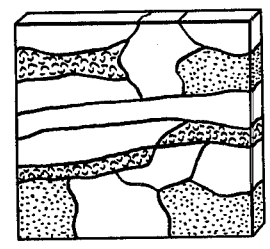

The SMC in the form of the long strip or sheet was passed between rolls to tightly bond it to a polished aluminum sheet. The bonded sheet was cured by heating it to a temperature of 60° C. to obtain a long flat board of the appearance of a rock. Because the exothermic heat caused the SMC to reach a temperature of about 100° C. during curing, the added low shrinkage agent functioned well. Thus, the shaped article so produced had excellent surface gloss and had little shaping distortion. The shaped article had very clear boundaries in the respective pattern portions and a beautiful appearance, as is shown in FIG. 7(b).

EXAMPLE 3

The process for producing a BMC with a massive pattern as stated above was followed by using two types of compounds having a basic formulation as indicated in the following Tables 3 and 4.

Table 3

| Formulation of compound A | |
|---|---|
| Unsaturated polyester resin (amorphous) | 100 parts (by weight) |
| Low shrinkage additive (a 30% sytrene solution of polyestyrene) | 20 parts |
| Filler (calcium carbonate) | 200 parts |
| Coloring agent (chrome green) | 0.1 part |
| Hardener (lauroyl peroxide) | 1.5 parts |
| Thickening agent (MgO) | 1.0 part |

Table 4

| Formulation of compound B | |
|---|---|
| Unsaturated polyester resin | 100 parts (by weight) |
| Isophthatic acid type amorphous polyester | (30 parts) |
| Terephthalic acid type crystalline polyester | (70 parts) |
| Low shrinkage additive (a 30% styrene solution of polyesterene) | 20 parts |
| Filler (aluminum hydroxide) | 150 parts |
| Coloring agent (titanium white) | 0.01 part |
| Hardener (lauroyl peroxide) | 1.5 parts |
| Thickening agent (MgO) | 0.1 part |

The components of the compound A according to the formulation of Table 3 were charged into a mixer in the order indicated in Table 3. In the latter period of the kneading, the pressure in the mixer was reduced to remove the bubbles contained in the compound A. The resulting unthickened compound A was poured into a vessel measuring 70 cm in length, 70 cm in width, and 70 cm in depth and left standing overnight to produce a green compound A. The compound A was randomly cut into pieces of arbitrary volume within the range of about 0.1 to 100 cm$^3$. These pieces were charged at random into another vessel of 100-cm length, 100-cm width, and 100-cm depth which contained an unthickened compound B. In this case, while care was taken so as not to introduce air bubbles into the compounds, a BMC mass was produced wherein the green compound A was distributed in an island-in-sea form throughout the white compound B.

The BMC mass was left standing overnight at a temperature of 20° C. and thereafter aged at a temperature of −5° C. for 3 days to promote the thickening thereof.

As described in Example 1, the thickened BMC mass was cut in the longitudinal direction into a sheet 2 cm thick to produce a molding SMC. The curing temperature of the SMC was between 80° C. to 120° C., whereas the softening temperature was between 80° to 100° C. for the green compound A, and between 40° to 50° C. for the white compound B. Consequently, even when a specific mold had a complicated shape with many concave and convex portions, when the SMC was set in the mold and pressed under heat, the white compound B was first fluidized with an increase in the temperature and pressure of the compounds and was charged into the innermost portion of the recesses together with the fine compound A included therein. Subsequently, the green compound A was also softened and charged into the mold completely in conformance with the shape of the mold.

After curing, a shaped article was removed from the mold. The shaped article thus obtained was voidless and had a very beautiful appearance of natural jadeite wherein green spots were distributed throughout a white background. The shaped article was characterized in that the green spot portions had little flow and fading and also showed a clear sectional pattern similar to the act and polished section of natural jadeite.

EXAMPLE 4

Table 4

| Formulation of compound A | |
|---|---|
| Crystalline unsaturated polyester | 80 parts (by weight) |
| Low shrinkage agent | 20 parts |
| Filler (aluminum hydroxide) | 200 parts |
| Hardener (t-butyl peroctoate) | 1 part |
| Promoter | |
| cobalt octenoate (0.8% Co) | 0.15 part |
| calcium octenoate (0.5% Ca) | 0.4 part |
| lead octenoate (2.4% Pb) | 0.4 part |
| Lubricant (zinc stearate) | 2 parts |
| Hardening retarder (t-butylcatechol) | 0.3 part |

The components of a compound A according to the formulation of Table 4 and the components of a compound B which were identical to the components of the compound A except that they further included 1.0 part by weight of titanium white as a coloring agent were respectively mixed while being heated at a temperature of 50° C. A period of 20 minutes was required for these compounds to gel. In order to form the compounds A and B into a sheet having a thickness of 5 to 20 mm, respectively, each of the compounds A and B was poured into a mold, and the mold and the content therein were cooled to a temperature of −10° C. as rapidly as possible. As a result, after 24 hours, the compound underwent a sufficient thickening resulting in a cheesy, solid sheet. The sheets A and B were piled up in such a manner that one type of the sheet was laid upon the other type, and the piled sheets were pressed down to unite them together. After cutting, the united sheet mass was pressed at a temperature of 50° C. for 20 minutes to cure the sheet mass, thereby to produce a shaped article with a stratiform pattern.

I claim:
1. A process for producing a molding compound with a controlled color pattern which comprises the steps of:
 (a) preparing a plurality of unsaturated polyester resin compositions of different color tones and having fluidity, said compositions containing at least one thickening agent selected from the group consisting of metal oxide, metal hydroxide and crystalline unsaturated polyester;
 (b) thickening at least one of a pair of said compositions sufficiently so that it loses its fluidity by allowing said composition to stand for a period of time at a temperature effective to cause said thickening;
 (c) uniting the plurality of resin compositions after at least one of each pair of adjacent compositions to be united has been thickened sufficiently to lose its fluidity and determine physical boundary while retaining its uniting ability; and
 (d) further thickening the whole of the united resin compositions to form a solid or semi-solid molding compound.

2. A process as claimed in claim 1, wherein a bulk molding compound is produced according to said steps (a), (b), (c) and (d) and said compound is cut to produce a sheet molding compound.

3. A process as claimed in claim 1, wherein the unsaturated polyester resin composition comprises:
 (1) 100 parts by weight of an unsaturated polyester resin comprising:
  (i) an unsaturated polyester selected from
   a. esterified products of unsaturated dibasic acids or anhydrides thereof or a mixture of these acids or anhydrides and saturated dibasic acids and glycols,
   b. prepolymers substantially free of cross-links which are formed from saturated or unsaturated dibasic acids and unsaturated alcohols, and
   c. mixtures of a and b;
  (ii) a reactive monomer having an ethylenically unsaturated bond which is present in a weight ratio of 1:3 to 3:1 with respect to the unsaturated polyester;
 (2) 0 to 1 part by weight of a polymerization inhibitor; and
 (3) 0 to 5 parts by weight of a peroxide type hardener.

4. A process as claimed in claim 3, wherein the unsaturated polyester resin compositions further contains the following components in the quantities indicated below with respect to 100 parts by weight of the unsaturated polyester resin:
 (4) 0 to 1000 parts by weight of fillers;
 (5) 0 to 5 parts by weight of thickening agents;
 (6) 0 to 40 parts by weight of low shrinkage additives; and
 (7) coloring agents.

5. A process as claimed in claim 1, wherein metal oxides or hydroxides as a thickening agent are included in the unsaturated polyester resin compositions.

6. A process as claimed in claim 1, wherein a crystalline unsaturated polyester is used as a polyester component in the unsaturated polyester resin compositions; and the thickening of the resin compositions is accomplished by cooling the heated and softened resin compositions in said step (c) or (d).

7. A process as claimed in claim 1, wherein crystalline unsaturated polyesters are at least partially used as a polyester component in the unsaturated polyester resin compositions and metal oxides or hydroxides as a thickening agent are further included in the unsaturated polyester resin compositions, and the thickening of the resin compositions is carried out by a combination of thickening due to the action of the thickening agent and thickening due to crystallization at a low temperature.

8. A process as claimed in claim 1, wherein different thickening agents are included in the adjacent compounds to be united of the plurality of unsaturated polyester resin compositions.

9. A process as claimed in claim 1, wherein crystalline polyesters having different melting and softening points are respectively included in the adjacent resin compositions to be united of the plurality of unsaturated polyester resin compositions.

10. A process as claimed in claim 1, wherein the adjacent resin compositions to be united of the plurality of resin compositions consist of a combination of two compounds selected from the following resin compositions:
   (a) a compositions containing a thickening agent consisting of a metal oxide or hydroxide;
   (b) a compositions containing a crystalline unsaturated polyester as an unsaturated polyester component; and
   (c) a compound containing a thickening agent consisting of a metal oxide or hydroxide and a crystalline unsaturated polyester.

11. A process as claimed in claim 4, wherein the thickening agent is selected from the group consisting of magnesium oxide, magnesium hydroxide, calcium oxide and lithium hydroxide.

12. A process as claimed in claim 6, wherein the crystalline unsaturated polyester is a member selected from the group consisting of:
   (a) condnesation products of symmetric aliphatic glycols and fumaric acid or lower alkyl ester of fumaric acid, and
   (b) condensation products of symmetric saturated dibasic acids, aliphatic glycols and ethylenically unsaturated dibasic acids.

13. A process as claimed in claim 10, wherein the crystalline unsaturated polyester is a member selected from the group consisting of:
   (a) condensation products of symmetric aliphatic glycols and fumaric acid or lower alkyl ester of fumaric acid, and (b) condensation products of symmetric saturated dibasic acids, aliphatic glycols and ethylenically unsaturated dibasic acids.

* * * * *